(12) United States Patent
Patnala et al.

(10) Patent No.: US 11,012,475 B2
(45) Date of Patent: May 18, 2021

(54) MANAGING COMPUTER SECURITY SERVICES FOR CLOUD COMPUTING PLATFORMS

(71) Applicant: Valtix, Inc., Milpitas (CA)

(72) Inventors: Praveen Patnala, Santa Clara, CA (US); Vishal Jain, San Jose, CA (US); Vijay Chander, San Ramon, CA (US)

(73) Assignee: VALTIX, INC., Santa Clara, CA (US)

( * ) Notice: Subject to any disclaimer, the term of this patent is extended or adjusted under 35 U.S.C. 154(b) by 383 days.

(21) Appl. No.: 16/172,006

(22) Filed: Oct. 26, 2018

(65) Prior Publication Data

US 2020/0137125 A1    Apr. 30, 2020

(51) Int. Cl.
*H04L 29/06* (2006.01)
*G06F 21/64* (2013.01)
(Continued)

(52) U.S. Cl.
CPC ........ *H04L 63/205* (2013.01); *G06F 9/45558* (2013.01); *G06F 16/951* (2019.01);
(Continued)

(58) Field of Classification Search
CPC ....... H04L 63/20; H04L 63/06; H04L 63/205; H04L 63/0272; H04L 63/0428; G06F 16/9538; G06F 16/951
(Continued)

(56) References Cited

U.S. PATENT DOCUMENTS 7,203,740 B1    4/2007 Putzolu
7,490,350 B1    2/2009 Murotake
(Continued)

*Primary Examiner* — Farid Homayounmehr
*Assistant Examiner* — Sanchit K Sarker
(74) *Attorney, Agent, or Firm* — Hickman Becker Bingham Ledesma LLP

(57) ABSTRACT

A computer-implemented method of managing security services for one or more cloud computing platforms is disclosed. The method comprises receiving, by a main controller, a security policy from a client device, the client device being associated with a set of computing applications hosted by one or more independent, private virtual clusters on one or more cloud computing platforms, the main controller residing outside the one or more virtual clusters, each of the one or more virtual clusters to be served by a security gateway system residing within the one or more cloud computing platforms, the security policy indicating how threat intelligence data is to be applied to the set of computing applications with respect to a plurality of application scopes; receiving application data from the client device, the application data indicating whether a specific computing application of the set of computing applications has one or more application properties of a plurality of application properties, the plurality of application properties corresponding to the plurality of application scopes, the one or more application properties including a functional attribute related to a function of the specific computing application, obtaining a piece of threat intelligence data from a data source; mapping the piece of threat intelligence data to the plurality of application scopes; determining to which of the one or more security gateway systems to send the piece of threat intelligence data based on the security policy; transmitting the piece of threat intelligence data to at least one of the one or more security gateway systems based on the determining.

20 Claims, 7 Drawing Sheets

(51) Int. Cl.
*H04L 12/26* (2006.01)
*G06F 9/455* (2018.01)
*G06F 16/951* (2019.01)
*H04L 29/08* (2006.01)
*H04L 12/66* (2006.01)

(52) U.S. Cl.
CPC .............. *G06F 21/64* (2013.01); *H04L 43/10* (2013.01); *H04L 63/0428* (2013.01); *H04L 63/102* (2013.01); *H04L 63/107* (2013.01); *H04L 63/1416* (2013.01); *H04L 63/1441* (2013.01); *H04L 63/302* (2013.01); *G06F 2009/45587* (2013.01); *H04L 12/66* (2013.01); *H04L 63/08* (2013.01); *H04L 67/10* (2013.01)

(58) Field of Classification Search
USPC .............................................................. 726/1
See application file for complete search history.

(56) References Cited

U.S. PATENT DOCUMENTS

| | | | |
|---|---|---|---|
| 7,774,591 | B2 | 8/2010 | Kamiya |
| 8,307,418 | B2 | 11/2012 | Devdhar |
| 8,826,414 | B2 | 9/2014 | Yoo |
| 9,910,705 | B1 | 3/2018 | Mak |
| 10,171,423 | B1 | 1/2019 | Woodberg |
| 2012/0304277 | A1* | 11/2012 | Li ....................... H04L 63/0281 726/12 |
| 2014/0075494 | A1* | 3/2014 | Fadida ................ G06F 9/45558 726/1 |
| 2015/0215334 | A1* | 7/2015 | Bingham ............ H04L 63/1425 726/23 |
| 2017/0093675 | A1* | 3/2017 | Chuang ................ H04L 41/0896 |
| 2017/0250870 | A1* | 8/2017 | Zhao ........................ H04L 63/20 |
| 2020/0059492 | A1* | 2/2020 | Janakiraman ....... H04L 63/0263 |

* cited by examiner

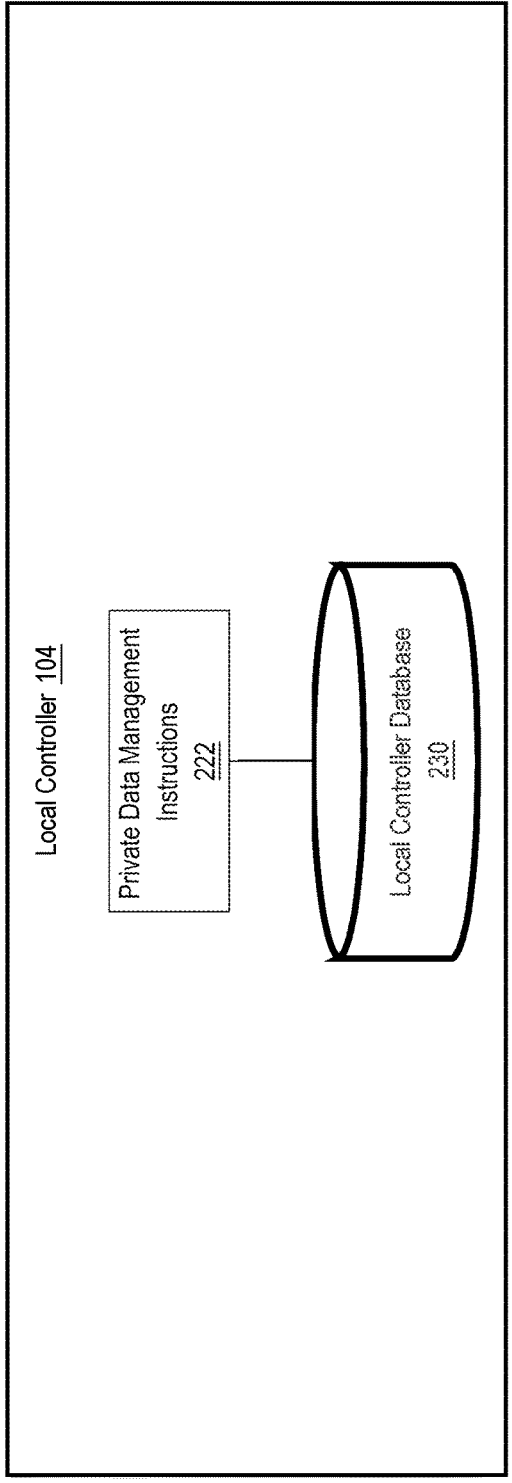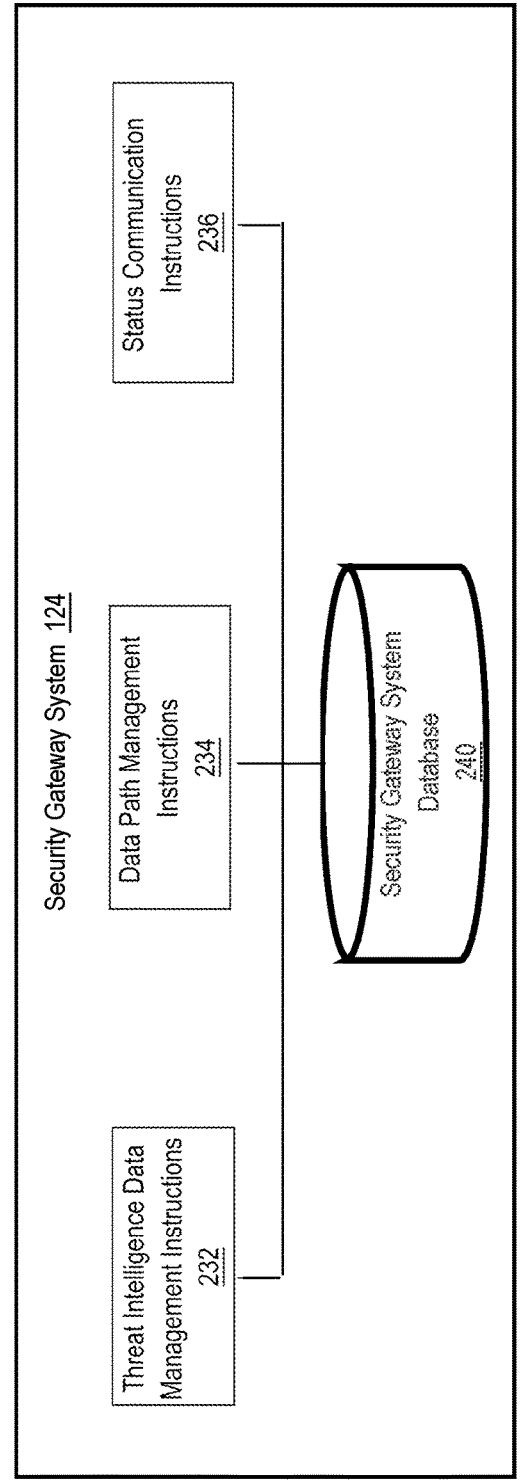
FIG. 2B
FIG. 2C

FIG. 3

| 316 Index | 302 Type | 304 Source | 306 Global | 308 Geo | 310 Cluster | 312a Attr A | ... | 312n Attr N | 314 Impact |
|---|---|---|---|---|---|---|---|---|---|
| 320 | IP reputations | Certain website | | | | | | | |
| 330 | | | | | | | | | |
| 340 | | | Yes | | | | | | |
| 350 | | | | | VC1, VC2 | Yes | | | More than threshold |

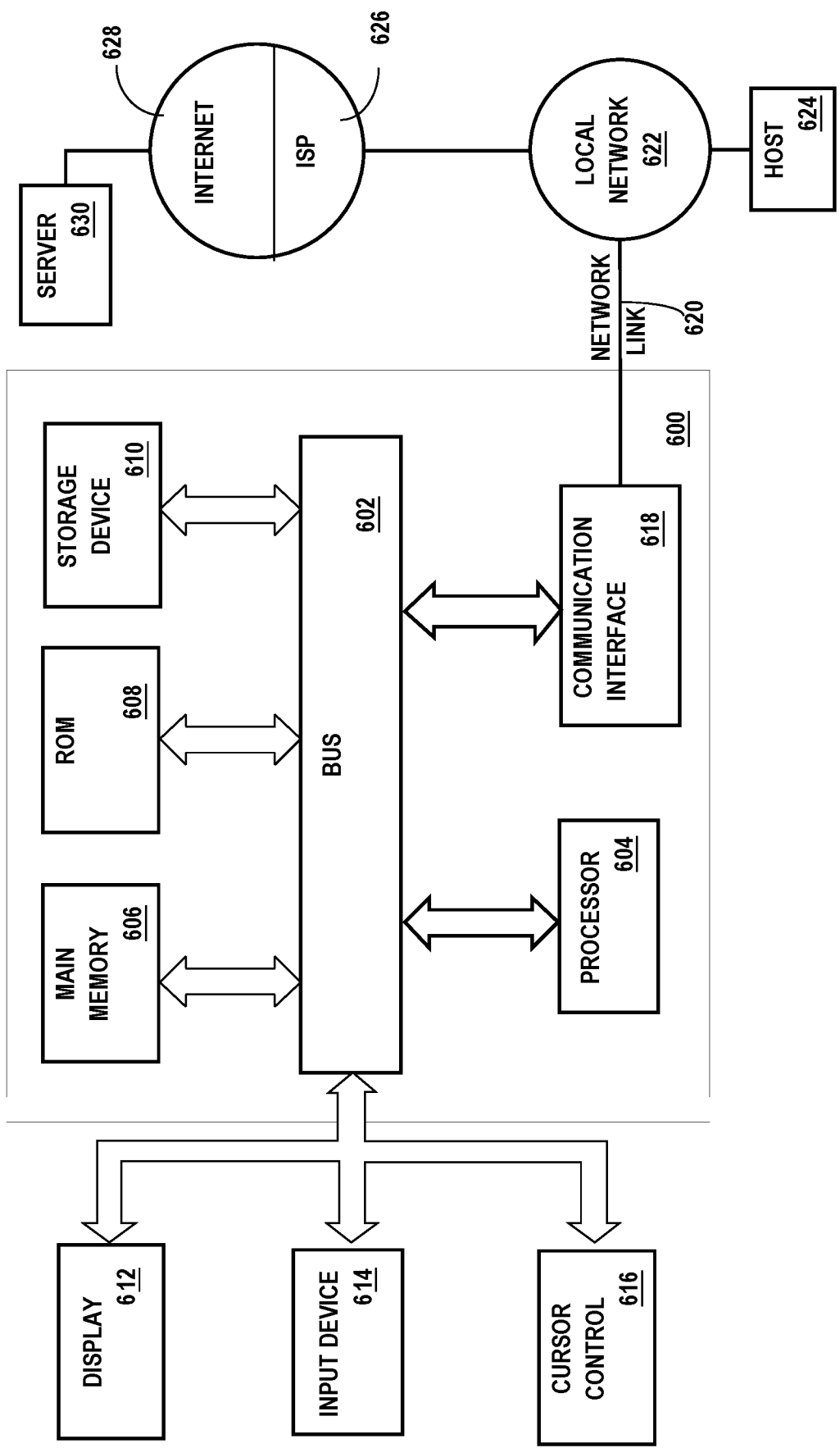

MANAGING COMPUTER SECURITY SERVICES FOR CLOUD COMPUTING PLATFORMS

FIELD OF THE DISCLOSURE

The present disclosure relates to the technical area of computer network security. The present disclosure specifically relates to a system that manages computer security services for cloud computing platforms.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, enterprise computer systems are often built on cloud computing platforms. To protect workloads running on these cloud computing platforms against infiltration and data exfiltration attacks, secure solutions can be applied to these cloud computing platforms. Different enterprise computing systems might have distinct needs in computer network and data security. For example, these enterprise computing systems might want to apply respective sets of rules to eliminate computer security threats depending on the number or nature of the computing applications operated by these enterprise computing systems. It would be helpful to efficiently satisfy the distinct needs of the enterprise computer systems while optimizing computing resource utilization.

BRIEF DESCRIPTION OF THE DRAWINGS

In the drawings:

FIG. 2B illustrates example computer components of a local controller.

FIG. 2C illustrates example computer components of a security gateway system.

FIG. 3 illustrates an example security policy.

FIG. 6 is a block diagram that illustrates a computer system upon which an embodiment of the invention may be implemented.

DETAILED DESCRIPTION

Figure 1:
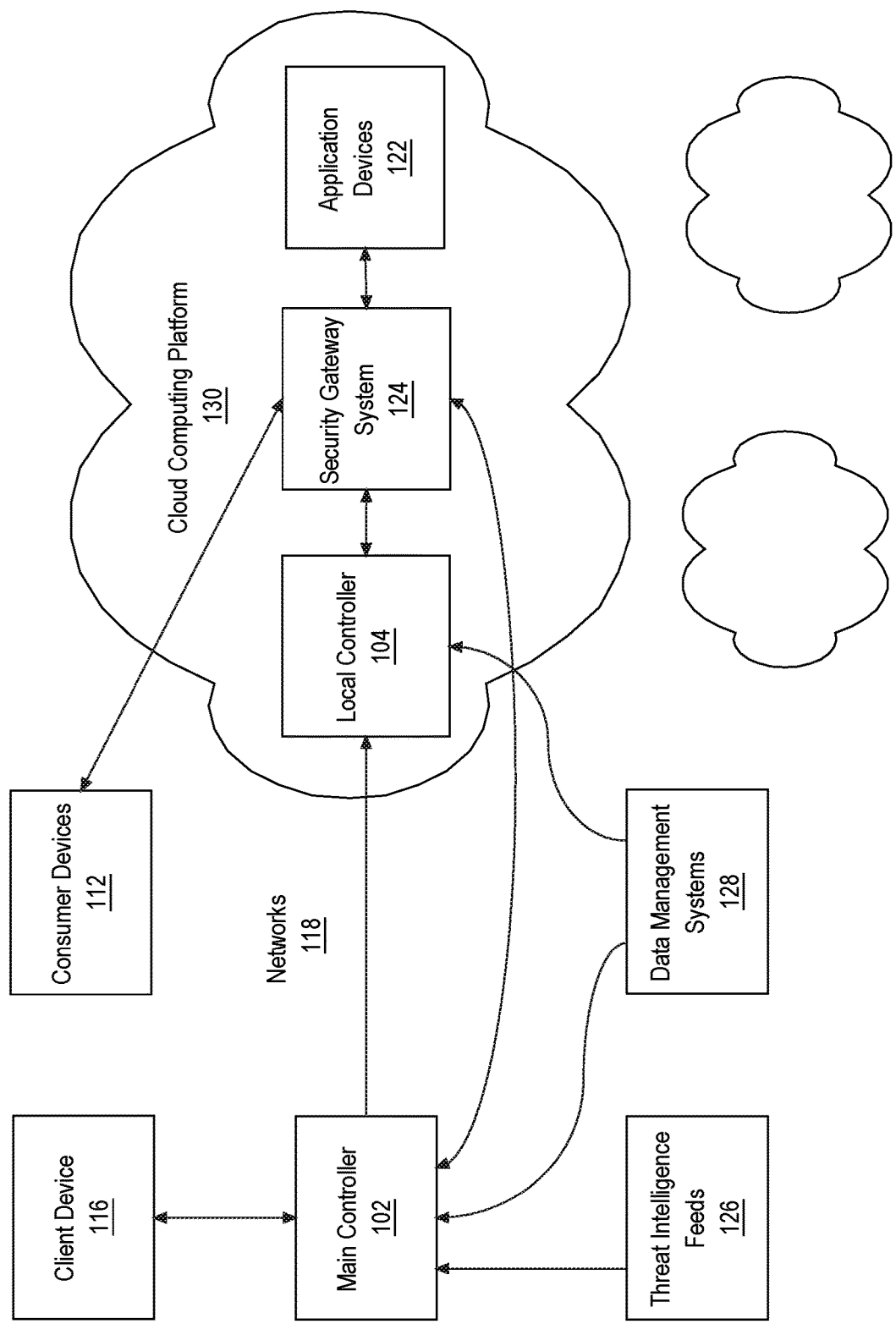
FIG. 1 illustrates an example computing environment with which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENTS
3. EXAMPLE COMPUTER COMPONENTS
   3.1. Main Controller
   3.2. Local Controller
   3.3. Security Gateway System
4. FUNCTIONAL DESCRIPTIONS
   4.1. Main Controller
      4.1.1. Managing Client Accounts
      4.1.2. Managing Local Controllers and Security Gateway Systems
      4.1.3. Managing Threat Intelligence Feeds
   4.2. Local Controller
   4.3. Security Gateway System
      4.3.1. Communicating Health and Operational Data
      4.3.2. Managing Threat Intelligence Data
5. EXAMPLE PROCESSES
6. IMPLEMENTATION EXAMPLE—HARDWARE OVERVIEW
7. EXTENSIONS AND ALTERNATIVES

1 GENERAL OVERVIEW

A system that manages computer security services for cloud computing platforms is disclosed. In some embodiments, each of one or more client devices may be associated with a set of computing applications operating on application devices as part of one or more virtual clusters of one or more cloud computing platforms. The set of computing applications can be executed in response to requests from consumer devices. The system comprises a main controller that typically resides outside the one or more virtual clusters. The system further comprises a local controller and a security gateway system for each of the one or more virtual clusters. The local controller and the security gateway system typically reside within the one or more virtual clusters and are considered to serve the one or more virtual clusters or the computing applications hosted by the virtual clusters. The system offers security services to protect the computing applications for the one or more client devices.

In some embodiments, the main controller is programmed to manage operations of the local controllers and security gateway systems. More specifically, the main controller is programmed to determine when to launch or terminate a local controller or security gateway system based on updates or other communications from the client devices, the local controllers, or security gateway systems. The main controller is programmed to also manage security policies and threat intelligence data. More specifically, the main controller is programmed to collect and help enhance security policies from client devices. The main controller is also programmed to determine how to collect threat intelligence data from online threat intelligence feeds or the security gateway systems and how to distribute the collected threat intelligence data to the security gateway systems based on the security policies provided by client devices.

In some embodiments, the local controller is programmed to manage private data of the client devices that are utilized in network security gateway functions, such as security keys for conforming to the transport layer security protocols or threat intelligence data that refers to personal information, including credit numbers.

In some embodiments, the security gateway system is programmed to perform network security gateway functions for the computing applications, including applying threat intelligence data received from the main controller or retrieved from the local controller. The security gateway system can be programmed to apply existing threat intelligence data to a communication just received from a consumer device or from one of the application devices, before the communication reaches the destination application device. The security gateway system can also be programmed to apply new threat intelligence data to past communications to confirm past impact or estimate future impact of the new threat intelligence data. The security gateway system is further programmed to forward any communication that is deemed to be secure to the destination application device for the target computing application.

By virtue of the various features described herein, the system produces many technical benefits. In various embodiments, the main controller assists in the management and improvement of security policies that determine which types of threat intelligence data would apply to which computing applications, which helps improve the speed and quality of protection for the computing applications while reducing the workloads of the client devices. The main controller also manages the scaling of the system based on the health indicators or workloads of the various components, leading to efficient usage of computing resources. The main controller in coordination with the local controllers enables a higher level of security for private or sensitive data of the client devices. The main controller in coordination with the security gateway systems enables intelligent and efficient application of threat intelligence data to counter computer security threats. The main controller in coordination with the security gateway systems further enable confirmation or estimation of the impact of computer security threats, which further leads to improved security policies and protection for the computing application.

2 EXAMPLE COMPUTING ENVIRONMENTS

FIG. 1 illustrates an example computing environment with which various embodiments may be practiced. FIG. 1 is shown in simplified, schematic format for purposes of illustrating a clear example and other embodiments may include more, fewer, or different elements.

In some embodiments, the computing environment includes a main controller 102, one or more consumer devices 112, one or more threat intelligence feeds 126, one or more data management systems 128, and, running on each cloud computing platform 130, a local controller 104, a security gateway system 124, and one or more application devices 122, which are communicatively coupled directly or indirectly via one or more networks 118.

In some embodiments, the cloud computing platform 130 comprises a pool of configurable system resources, each of which may include one or more of a general-purpose processor, a special-purpose processor, or programmable hardware. For example, public cloud computing platforms may include x86 processors, FPGAs, or GPUs. The cloud computing platform 130 is typically programmed to provide fundamental computing services and enable rapid deployment of independent, higher-level computing applications or services by one or more enterprises with minimum infrastructure management efforts. The cloud computing platform 130 may be partitioned into virtual clusters each offering an independent infrastructure for an individual enterprise to implement a set of higher-level computing applications or services.

In some embodiments, the one or more application devices 122 correspond to one of the virtual clusters implementing the set of higher-level computing applications or services noted above. The one or more application devices 122 can run as virtual instances or bare metal (physical) instances. For example, an application device may include a Web server computer managing a Web service of handling account authentication. The one or more application devices 122 are programmed to communicate with the one or more consumer devices 112 through the security gateway system 124.

In some embodiments, the client device 116 is associated with the individual enterprise noted above. The client device 116 is programmed to set up the application devices 112 on the one virtual cluster of the cloud computing platform 130 or other application devices on other virtual clusters of the same or other cloud computing platforms. The client device 116 is also programmed to communicate with the main controller 102 to set up and control an account for receiving computer security services for the application devices 122, as further discussed below. The account data includes a security policy indicating how threat intelligence data should be used to improve security for the application devices 122. The client device 116 can be programmed to also communicate keys or other private data to the local controller 104 or one of the data management systems 128 through the main controller 102 or the security gateway system 124. The client device 116 may comprise computing facility with sufficient computing power in data processing, data storage, and network communication for the above-described functions.

In some embodiments, the main controller 102 broadly represents one or more computers, virtual computing instances, and/or instances of a server-based application. The main controller 102 typically resides outside the virtual clusters associated with the client device 116. For example, the main controller may reside in another virtual cluster on the cloud computing platform 130 or on another cloud computing platform. The main controller 102 is programmed to manage a security services architecture, which additionally includes a local controller 104 and a security gateway system 124 for each virtual cluster. Such management includes performance monitoring and reporting, system scaling, service maintenance or upgrade, or general communication and coordination. The main controller 102 is further programmed to communicate with the client device 116, as noted above. In addition, the main controller 102 is programmed to communicate with the one or more threat intelligence feeds 126 or the one or more data management systems 128 to obtain threat intelligence data or private data. The server 102 can comprise a server farm, a cloud computing platform, a parallel computer, special-purpose hardware, or any other computing facility with sufficient computing power in data processing, data storage, and network communication for the above-described functions.

In some embodiments, the local controller 104 broadly represents computers, virtual computing instances or virtual appliances, and/or instances of a server-based application. The local controller 104 typically resides within the cloud computing platform 130 or otherwise within a private communication network associated with the client device 116. The local controller 104 is programmed to provide secure data management services, which could apply to private keys or other personal information. The local controller 104 can be configured to receive encrypted private data initially from the main controller 102, the security gateway system 124, or one of the data management systems 128. The local controller 104 may utilize some of the configurable system resources on the cloud computing platform 130 or otherwise comprise computing facility with sufficient computing power in data processing, data storage, and network communication for the above-described functions.

In some embodiments, the security gateway system 124 broadly represents computers, virtual computing instances or virtual appliances, and/or instances of a server-based application. The security gateway system 124 generally resides within the cloud computing platform 130 or even the virtual cluster to utilize some of the configurable system resources on the cloud computing platform 130. The security gateway system 124 is configured to generally host or execute functions including but not limited to network firewall capabilities for the application devices 122. More specifically, the security gateway system 124 is configured to maintain network and data security not only between the cloud computing platform 130 and the external environment where the one or more consumer devices 112 operate, as further discussed below, but also within the cloud computing platform 130, including the virtual cluster where the one or more application devices 122 belong. In maintaining network and data security, the security gateway system 124 is programmed to receive threat intelligence data from the main controller 102 or the local controller 104. For any communication between one of the consumer devices 112 and one of the application devices 122, the security gateway system 124 is programmed to further analyze the communication with respect to the threat intelligence data and take appropriate actions to reduce or eliminate security risk to the application devices 112. An implementation of the security gateway system 124 is discussed in detail in the co-pending U.S. patent application Ser. No. 16/019,539 filed on Jun. 27, 2018, the entire contents of which are herein incorporated by reference.

In some embodiments, each of the one or more consumer computers 112 is programmed to communicate with the one or more application devices 122 through the security gateway system 124. More specifically, a consumer device may be configured to transmit requests to execute one of the computing applications or services hosted by one of the application devices 122 or receive the output data from the one computing application or service from the one application device. The consumer device may comprise computing facility with sufficient computing power in data processing, data storage, and network communication for the above-described functions. In certain embodiments, the consumer device 112 can comprise a desktop computer, laptop computer, tablet computer, smartphone, wearable device, etc.

In some embodiments, each of the one or more threat intelligence feeds 126 is programmed to provide threat intelligence data. Threat intelligence data may range from a reputation of to specific threat details of a network component. For example, an IP address might have a bad reputation for phishing, or a computer executable having a filename that satisfies a specific pattern might be known to delete files on a computer once the computer executable is executed on that computer. The one or more threat intelligence feeds 126 may be programmed to receive requests for threat intelligence data and provide such data in response to the requests. A threat intelligence feed may comprise computing facility with sufficient computing power in data processing, data storage, and network communication for the above-described functions.

In some embodiments, each of the data management systems 128 is programmed to provide secure data management services, which could apply to private keys or other personal information. A data management system serves a similar role as the local controller 104 and can be relied upon to perform certain functions instead of or in conjunction with the local controller 104. In that capacity, the data management system is further programmed to communicate with the main controller 102 or the local controller 104 to provide the secure management services. The data management system may comprise computing facility with sufficient computing power in data processing, data storage, and network communication for the above-described functions.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the client device 116 is programmed to set up an account with the main controller 102, providing a security policy that applies to the one or more application devices 112 as part of the virtual cluster on the cloud computing platform 130 or additional application devices as part of other virtual clusters. The security policy generally indicates which types of threat intelligence data are desirable and at which scope each of these types of threat intelligence data should apply. The main controller 102 is programmed to then set up the account, including storing the security policy. The main controller 102 is programmed to also cause launching the local controller 104 and the security gateway system 124 within the virtual cluster. The client 116 is programmed to further send encrypted keys, private threat intelligence data, or instructions for accessing certain private data from one of the data management systems 128 to the main controller 102, which is programmed to then forward such private data or access instructions to the local controller 104 for storage.

In some embodiments, the main controller 102 is programmed to collect threat intelligence data from the threat intelligence feeds 126, such as crawling web interfaces of the threat intelligence feeds 126. The main controller 102 is programmed to further determine whether to send the collected threat intelligence data to the security gateway system 124 based on the security policy provided by the client device 116.

In some embodiments, the security gateway system 124 is programmed to receive threat intelligence data from the main controller 102 and store the threat intelligence data. The security gateway system 124 is programmed to subsequently receive a request from one of the consumer devices 112 for executing a computing application hosted by one of the application devices 122. The security gateway system 124 is programmed to retrieve the security keys and any private threat intelligence data from the local controller 104 in processing the request. In addition, the security gateway system 124 is programmed to apply the stored or newly retrieved threat intelligence data to the request and determine whether to send the request or related data to the application devices 122. In the case where a security anomaly is detected, the security gateway system 124 can be programmed to reject the request and send information related to the security anomaly to the main controller 102, which can be programmed to further analyze or distribute such information. In the case where no security anomaly is detected, the security gateway system 124 is programmed to subsequently receive a response to the request from the application device and ultimately send the response to the consumer device.

In some embodiments, the security gateway system 124 is programmed to provide heartbeats to the main controller indicating its general health and workload. The main controller 102 is programmed to then take management actions, such as upgrading software installed on the security gateway system 124, removing the security gateway system 124, or adding another security gateway system to the virtual cluster on the cloud computing platform 130. The main controller 102 can be programmed to similarly upgrade software installed on the local controller 104. The main controller 102 is programmed to further generate reports on system operation or performance and communicate the reports to the client device 116.

3. EXAMPLE COMPUTER COMPONENTS

Figure 2A:
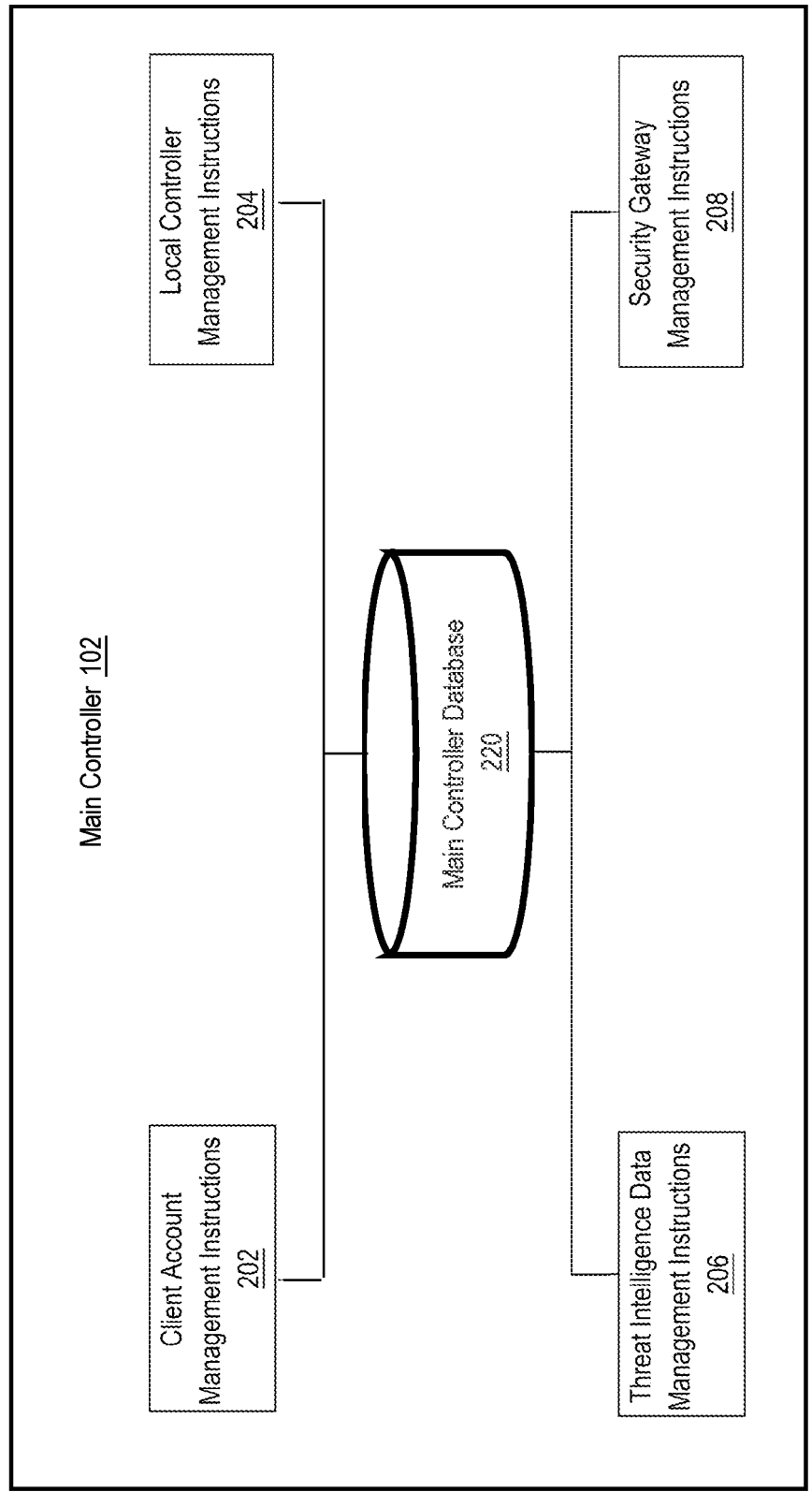
FIG. 2A illustrates example computer components of a main controller.

FIG. 2A, FIG. 2B, and FIG. 2C are each shown in simplified, schematic format for purposes of illustrating a clear example and other embodiments may include more, fewer, or different elements connected in various manners. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

3.1 Main Controller

FIG. 2A illustrates example computer components of a main controller. In some embodiments, the main controller 102 comprises client account management instructions 202, local controller management instructions 204, threat intelligence feed management instructions 206, and security gateway management instructions 208. The main controller 102 also comprises a main controller database 220.

In some embodiments, the client account management instructions 202 enable managing client accounts. Each client account may include data related to a set of computing applications running on cloud computing platforms, secure keys or other private data associated with each of the set of computing applications, or a security policy indicating how different types of threat intelligence data apply to the set of computing applications. The management may include receiving client account data from a client device and storing the client account data locally or in a remote system. The management may further include receiving requests for an account status from the client device or transmitting various metrics regarding the set of computing applications to the client device.

In some embodiments, the local controller management instructions 204 enable managing local controllers. The management may include initiating, upgrading, or terminating a local controller for each of the virtual clusters of cloud computing platforms hosting the set of computing applications. A local controller is initiated in response to a client account being set up. The local controller can remain active even when the computing applications served by the local controller are offline. The initiation may include establishing a communication channel between the local controller residing within the virtual cluster and the main controller 102 residing outside the virtual cluster and passing encrypted private data received from the client device to the local controller.

In some embodiments, the threat intelligence data management instructions 206 enable managing threat intelligence data. The management may include collecting various types of threat intelligence data from online threat intelligence feeds, which may each offer a distinct interface for accessing the feed data. The management may also include receiving custom threat intelligence data from a client device or additional threat intelligence data from the security gateway systems. The management may further include distributing the various types of threat intelligence data to the security network gateways. The distribution can include evaluating the various types of threat intelligence data with respect to the security policy provided by each client device and determining how to distribute the various types of threat intelligence data to the security network gateways. For example, real-time analysis or a security policy provided by a client device may indicate that a certain type of threat intelligence data applies or should be applied to all the computing applications which store data in an external server. The evaluation can then direct the certain type of threat intelligence data to every security gateway system that serves computing applications which store data in an external server.

In some embodiments, the security gateway management instructions 208 enable management of security gateway systems. The management may include initiating, upgrading, or terminating a security gateway system for each of the virtual clusters of cloud computing platforms hosting the set of computing applications or changing the number of security gateway systems serving each of the virtual clusters. A security gateway system is initiated in response to a client account being set up. The initiation may include establishing a communication channel between the security gateway system residing within the virtual cluster and the main controller 102 residing outside the virtual cluster. Regular heartbeats of the security gateway system can be transmitted to the main controller 102, which allows termination of the security gateway system when the workload is low because corresponding computing applications are offline or addition of a security gateway system when the workload of the existing security gateway system exceeds a certain threshold.

In embodiments, the main controller database 220 is programmed or configured to manage relevant data structures and store relevant data for functions performed by the main controller 102. The data may be related to client accounts, virtual clusters, cloud computing platforms, local controllers, security gateway systems, online threat intelligence feeds, data management systems. The data may also include threat intelligence data, heartbeats, indicators of system failures or other events, system performance metrics, client requests, or database transactional states.

In some embodiments, the main controller 102 may operate as a software as a service (SaaS) or alternatively as packaged software. The different computer components can be implemented as microservices using containers, where each component can scale horizontally. For example, the main computer components can be implemented as kubernetes pods while the secondary computer components can be implemented as serverless applications. The states of the main controller 102 can be stored in the main controller database 220 to facilitate horizontal scaling.

3.2 Local Controller

FIG. 2B illustrates example computer components of a local controller. In some embodiments, the local controller 104 comprises private data management instructions 222. The local controller 104 also comprises a local controller database 230.

In some embodiments, the private data management instructions 222 enable management of private data, such as security keys, threat intelligence rules referring to personal information associated with a computing application or a client account, or credentials for an account with a data management system that stores certain private data. The management typically satisfies various goals of cryptography, such as confidentiality, integrity, authentication, or nonrepudiation. The management can rely on an existing secure data management solution, such as one offered by one of the cloud computing platforms, data management systems, or other solutions known to someone skilled in the art. An example is utilizing a Key Management System (KMS) with Identity and Access Management (IAM) policies provided by Amazon Web Services (AWS). Another example is a secure data management solution that complies with the Key Management Interoperability Protocol (KMIP) standard. The management can further include enabling controlled access to the private data through a graphical user interface (GUI) or an application programming interface (API). Such access may include storing private data received from the main controller or a database management system or providing the private data to a security gateway system.

In some embodiments, the local controller database 230 is programmed or configured to manage relevant data structures and store relevant data for functions performed by the local controller 104. The data may include private keys or other personal information associated with specific computing applications or client accounts, data related to data management systems, access control lists for the private data, or network configurations for communication with the main controller.

3.3 Security Gateway System

FIG. 2C illustrates example computer components of a security gateway system. In some embodiments, the security gateway system 124 comprises threat intelligence application instructions 232, data path management instructions 234, and communication instructions 236. The security gateway system 124 also comprises a security gateway system database 240.

In some embodiments, the threat intelligence data management instructions 232 enable collection of threat intelligence data. The threat intelligence data may be received from the main controller and stored in a local database. The threat intelligence data may also be retrieved from the local controller when a digital communication is received by the security gateway system 124. The threat intelligence data management instructions 232 also enable application of threat intelligence data to a digital communication received from a consumer device or one of the application devices. Different types of threat intelligence data may have different application scopes that affect different computing applications. The application of the threat intelligence data may include determining whether the digital communication or related data should then be processed through a complete data path or communicated to the destination application device. Upon a determination that the digital communication should be processed through a complete data path, application-level data or other metadata can be extracted or inferred from the digital communication, as discussed above, and evaluated against the threat intelligence data. When there is a match indicating a threat, the digital communication can be cleaned up or discarded. The application may further include storing all the received digital communications and determining whether or how past requests match new threat intelligence data.

In some embodiments, the data path management instructions 234 enable high-speed, deep inspection of digital communications in performing network security gateway functions. Each digital communication may be between a consumer device or a source application device and a target application device. The efficiency comes from building a data path for processing a digital communication on the virtual cluster served by the security gateway system or one of the cloud computing platforms, which may enhance lower-performance hardware with additional higher-performance hardware. Such high-speed performance of network security gateway functions is discussed in further detail in the co-pending U.S. patent application Ser. No. 16/019,539 filed on Jun. 27, 2018 referenced above.

In some embodiments, the status communication instructions 236 enable communication with the one or more the main controller. The communication may include transmitting heartbeats indicating the health or other operating status of the security gateway system 124 or computed metrics based on such status data to the main controller. Additional data can be transmitted to the main controller, such as specific payloads or data related to anomaly detection, to enable cross-cluster analysis and provision of additional threat intelligence data to other security gateway systems. The communication may also include receiving instructions from the main controller to shut down or adjust performance.

In some embodiments, the security gateway system database 240 is programmed or configured to manage relevant data structures and store relevant data for functions performed by the security gateway system 124. The data may be related to threat intelligence, service requests to execute computing applications, output data from the computing applications, threat intelligence application results, or other anomaly detection results.

4. FUNCTIONAL DESCRIPTIONS

4.1 Main Controller

4.1.1 Managing Client Accounts

In some embodiments, the main controller 102 is programmed to receive a request from a client device to set up an account and store at least some account data included in the request or subsequently received from the client device. The account data enables the main controller 102 to provide computer security services to a set of computing applications associated with the client device and hosted by one or more virtual clusters on one or more cloud computing platforms.

In some embodiments, the account data can include cloud data regarding each of one or more virtual clusters and associated with cloud computing platforms, such as the geographical location or the subnet information. The account data can include application data regarding each of the set of computing applications in terms of different application properties. The application data can include basic information, the membership of a virtual cluster, the public and private IP addresses, the name, the API, or the function. The application data can also include specific configurations for each computing application that is not captured in the API. The application data can further include specific features or tags for each computing application, where each feature can include a key and a value for the key. For example, the key can be a keyword, and the value can be "CPU-intensive". The main controller 102 can be configured to allow to pre-define a key or allow the client device to define a key. The main controller 102 can also be configured to request the client device to provide a value or automatically determine a value for a key. For example, from an API associated with an application device, the main controller 102 can be configured to determine one or more functional attributes related to the API, such as whether a computing application handles links to external repositories or handles input data having a complex structure.

In some embodiments, the account data can include security policy data regarding which types of threat intelligence data to apply to which of the set of computing applications associated with the client device. Threat intelligence data may indicate information ranging from a reputation of to specific detail of a threat to a computer component, which can be the source or a target of a threat. For example, the threat intelligence data may include a blacklist of known malicious or high-risk IP addresses or subnets, email domains known for conducting phishing attacks on email accounts associated with users in a specific demographic group, rouge websites that commit consumer frauds, or computer executables with specific names or content signatures which once loaded to computing systems access the files on the computing system without permissions.

In some embodiments, each type of the threat intelligence data can be mapped to one or more application scopes, which generally correspond to application properties, as noted above. The applications scopes may be broader than a computing application or correspond to application functional attributes, as further discussed below. The application scopes that are broader than a computing application can correspond to a virtual cluster, a cloud computing platform, a geographical location, or the set of all associations with a client device. For example, certain threat intelligence data may be of fundamental importance or have universal applicability that the certain threat intelligence data is to apply to all the computing applications that reside within a certain country. In terms of the mapping, characteristics of the source or a target of a threat can often directly lead to an application scope. In the examples discussed above, a blacklisted email domain targeting email accounts in a specific country might be mapped to an application scope corresponding to cloud computing platforms located in a specific geographic region or an application scope corresponding to an application functional attribute of email communication. The mapped application scopes can then be considered as properties of the threat intelligence data.

In some embodiments, the security policy can specify which types of threat intelligence data to receive via the mapping to the application scopes. In general, the mapping can readily determine whether a type of threat intelligence data would apply to the computing applications served by a security gateway system. However, sometimes it might be beneficial to receive and consider more than what is applicable for increased caution and safety or to receive and consider less than what is applicable for more economical utilization of computing resource.

FIG. 3 illustrates an example security policy. In some embodiments, the columns 302 through 314 correspond to different properties of a piece of threat intelligence data, including possible application scopes. The column 316 shows the row index. The column 302 indicates the type of the threat intelligence data, such as IP reputation. The column 304 indicates the source of the threat intelligence data, such as a certain website. The columns 306, 308, and 310 indicate application scopes broader than a computing application, such as global, per geographical region, per cloud computing platform, or per virtual cluster. The columns 312a through 312n indicate application scopes corresponding to application functional attributes, such as having a specific configuration parameter value or being CPU-intensive. These application scopes can include API-related scopes, such as having a large number of API functions or communicating with an external server. The column 314 indicates an estimated impact of the corresponding threat, as further discussed below.

In some embodiments, each row of the security policy could correspond to a rule that determines whether to receive certain threat intelligence data. There could be a default rule specifying that when the mapped application scopes of a piece of threat intelligence data match one of the computing applications served by a security gateway system, the piece of threat intelligence data is to be received by the security gateway system. There could be additional rules that indicate what other threat intelligence data is to be received by the security gateway system. The row 320 indicates that all the threat intelligence data from the certain website should be sent to the security gateway system. The row 330 indicates that all the threat intelligence data that includes IP reputation information should be sent to the security gateway system. The row 340 indicates that all the threat intelligence data that affects (or is likely or tend to effect) specific virtual clusters and computing applications having functional attribute A should be sent to the security gateway system. The row 350 indicates that all the threat intelligence data that affects all computing applications but has an estimated impact more than a certain threshold should be sent to the security gateway system. In addition, there could be additional rules that indicate what threat intelligence data is not to be received by the security gateway system even if the mapped application scopes of a piece of threat intelligence data match one of the computing applications served by a security gateway system. For example, one row can indicate that when the threat intelligence data has a geo scope and matches only a small percentage of the application functional attributes shared by any computing application served by the security gateway system, the type of threat intelligence data is not to be transmitted to the security gateway system. The different rules in the security policy can be ranked or given precedence in rule application.

In some embodiments, the account data can include private data, such as secure keys used by an application device in establishing a communication session with a consumer device. Another example of the private data is specific threat intelligence data that refers to personal information. An example of such specific threat intelligence data may be determining, by a computing application designed to detect identity theft, whether data submitted by a consumer device matches a certain social security number or a credit card number. The specific threat intelligence data can generally be stored directly on the virtual cluster hosting the computing application by the client device to be directly accessed by the computing application. Alternatively, the specific threat intelligence data can be submitted to the main controller 102 and stored as account data, as described here, to push application of the specific threat intelligence data out of the computing application. The private data discussed in this paragraph is eventually managed by the local controller serving the virtual cluster using a secure approach that satisfies various goals of cryptography. Therefore, the private data is also initially received in an encrypted form inaccessible to the main controller 102. The main controller 102 is programmed to refrain from storing the private data and simply forward the private data to the local controller.

In some embodiments, the account data can include additional private data, such as credentials for accounts with third-party data management systems. When the secure keys or specific threat intelligence data discussed above are already be stored and will be maintained in a certain account with a third-party data management system, the additional private data can be used to access the private data stored in that certain account. The main controller 102 can be configured to retrieve the private data from the certain account using the additional private data and directly send the private data to the local controller to avoid storing the additional private data locally. Furthermore, as the local controller typically resides on the virtual cluster together with the security gateway system serving the virtual cluster, while the security gateway system is also configured to communicate with the Internet, the private data or additional private data can be initially delivered to the security gateway system instead of the main controller 102.

In some embodiments, after an account is set up, the main controller 102 is programmed to receive a request from the client device for a status update. The status can indicate the health or workload of each of the set computing applications associated with the client device, the quantity and quality of the threat intelligence data that has been received and can be applied to the set of computing applications, or the security anomalies that have been detected and eliminated for the computing applications. The main controller is programmed to determine such status based on operational data received from the security gateway systems or threat intelligence feeds, as further discussed below, and transmit a status update to the client device.

In some embodiments, the main controller 102 is programmed to receive a subsequent request from the client device to close the account. The main controller 102 is programmed to delete the account data, effectively closing the account, and transmit a notification of the account being closed to the client device.

4.1.2 Managing Local Controllers and Security Gateway Systems

In some embodiments, in response to setting up an account for a client device, the main controller 102 is programmed to cause launching a local controller for each virtual cluster associated with the client device. For example, the launch may be achieved by sending an activation key to the client device, which is programmed to then execute the local controller using the activation key on the virtual cluster to be served by the local controller or another virtual cluster associated with the client device. Due to the generally limited scope of work performed by a local controller, the operation of the local controller tends to be stable and the number of local controllers serving each virtual cluster tends to remain constant. For a similar reason, the main controller 102 can be programmed to keep the local controller alive regardless of the status of the computing applications or security gateway systems operating on the virtual cluster served by the local controller. As a result, the inconvenience of having to retransmit private data to a client device is eliminated. However, the main controller 102 can also be configured to receive heartbeats from the local controller and adjust the number or structure of local controllers for the virtual cluster, as discussed below in connection with a security gateway system. The main controller 102 can additionally be programmed to apply patches to the local controller or replace the local controller with an upgraded version according to a certain schedule. In response to closing the account for the client device, the main controller 102 is programmed to then terminate each local controller launched for the client device.

In some embodiments, in response to setting up an account for a client device, the main controller 102 is programmed to similarly cause launching a security gateway system for each virtual cluster associated with the client device. The main controller 102 is programmed to then receive heartbeats from the security gateway system, indicating that the security gateway system is alive and healthy. The main controller 102 may be programmed to receive additional operational data from the network security gateway, such as special error codes or failure indicators regarding the operation of the security gateway system or one of the computing applications served by the security gateway system.

In some embodiments, the main controller 102 is programmed to take specific notification or error-handling measures based on the heartbeats or additional operational data. The main controller 102 can be programmed to adjust the number or structure of gateway security systems based on their health indicators and workloads. Such scaling in or out would need to consider synchronization of operational states of the existing gateway security systems. The operational states may include the amount of network traffic, the number of network connections, or the latency of specific security functions. When the security gateway systems operate on cloud computing platforms that combine lower-performance portions, such as x86 processors, and higher-performance portions, such as FPGAs, the lower-performance portions can be expanded before the higher-performance portions in scaling out, and the lower-performance portions can be reduced after the higher-performance portions in scaling in.

In some embodiments, the main controller 102 can be programmed to execute predefined remedial procedures in accordance with the received error codes or failure indicators. For an error or a failure of one of the computing applications associated with the client device, the main controller 102 can be programmed to transmit a warning to the client device to trigger the execution of further remedial procedures. For an error or a failure of the security gateway system, the main controller 102 can be programmed to restart or upgrade the security gateway system. The main controller 102 can additionally be programmed to apply patches to the security gateway system or replace the security gateway system with an upgraded version according to a certain schedule.

In some embodiments, the main controller 102 is programmed to log the heartbeats or additional operational data received and compute various performance metrics related to the operations of the local controllers, the security gateway systems, or the set of computing applications associated with the client device. These performance metrics may include when each local controller, security gateway system, or computing application is launched, interrupted, or terminated, when and for how long each request is handled by a local controller, security gateway system, or various metrics related to the computing applications, as noted above. The main controller 102 is programmed to further generate reports by preselected or user-defined criteria and transmit the reports to an appropriate administrator device or the client device, as noted above. The generation and transmission of the reports can similarly occur based on a specific schedule or in response to specific trigger events.

4.1.3 Managing Threat Intelligence Feeds

In some embodiments, the main controller 102 is programmed to collect threat intelligence data from one or more online threat intelligence feeds for further analysis, as described below. Each of the online threat intelligence feeds may offer a distinct GUI, API, or another interface for accessing the available threat intelligence data. The main controller 102 can be programmed to communicate with each online threat intelligence feed via the associated interface. For example, the main controller 102 can be configured to obtain a blacklist of IP addresses or threat signatures from a threat intelligence website using any web crawling technique known to someone skilled in the art. Collection of threat intelligence data from each online threat intelligence feed can occur according to a specific schedule or in response to specific trigger events, such as receiving an instruction from the client device to collect threat intelligence data from a specific online threat intelligence feed or receiving a news update regarding new viruses from one of the online threat intelligence feeds.

In some embodiments, the main controller 102 is programmed to receive additional threat intelligence data from one or more security gateway systems. The security gateway system may be configured to detect security anomalies in digital communications among consumer devices and the application devices operating within the virtual cluster served by the security gateway system. Such anomaly is further discussed in the co-pending U.S. patent application Ser. No. 16/019,539 filed on Jun. 27, 2018. Information regarding such security anomalies may also apply to other virtual clusters or cloud computing platforms. Therefore, the main controller 102 can be programmed to receive anomaly data related to such security anomalies, which may be used to for further analysis, as described below.

As noted above, in some embodiments, the account data for a client device can include the specific threat intelligence data, which refers to personal information and is received in an encrypted form inaccessible to the main controller. The main controller 102 is programmed to forward such specific threat intelligence data to the local controllers.

As also noted above, in some embodiments, the account data for a client device can include additional private data, such as credentials for accounts with third-party data management systems. When certain threat intelligence data is continuously deposited into a certain account with a third-party data management system due to an existing subscription of the client device, the additional private data can be used to access the certain threat intelligence data for further analysis, as described below.

In some embodiments, the main controller 102 is programmed to analyze the available threat intelligence data. The analysis may include identifying information related to a source of a computer security threat, a nature of the computer security threat, or a target of the computer security threat. Information related to a source of the computer security threat may include a name, a geographical location, a domain name, an IP address, or any other characteristic of a computing device or a name, a size, a type, a pattern, or any other characteristic of digital data, including a computing application. Information related to the threat may indicate a type, such as hacking or unauthorized access, causing a denial of service, spamming, phishing, spoofing, spying, or pharming, a likely time of occurrence, or an expected amount of impact. Information related to a target of the threat may similarly include a peripheral component interconnect (PCI) or any other characteristic of a computing device or a GUI, an API, or any other characteristic of digital data, including a computing application. The analysis may further include determining various properties of each piece of threat intelligence data, as discussed above. Characteristics of the source or a target of a threat can often directly lead to an application scope.

In some embodiments, the main controller 102 is programmed to match the threat intelligence data with one or more security gateway systems operating on one or more cloud computing platforms. More specifically, the main controller 102 is programmed to determine whether the properties of each piece of threat intelligence data match the computing applications served by each security gateway system. The main controller 102 is programmed to then review the security policy covering those computing applications and apply the rules in the security policy to determine exactly which pieces of threat intelligence data is to be applied to each computing application and thus transmitted to the security gateway system serving that computing application.

In some embodiments, the main controller 102 is programmed to further distribute the threat intelligence data to the one or more security gateway systems operating on the one or more cloud computing platforms. The distribution can occur based on a specific schedule or in response to specific trigger events, such as receiving certain threat intelligence deemed to have an importance level exceeding a certain threshold, receiving an instruction to distribute available threat intelligence data, or having collected more than a specific volume of threat intelligence data. The specific schedule may be prepared for each client device, each cloud computing platform, each virtual cluster, or each application.

4.2 Local Controller

In some embodiments, the local controller 104 is programmed to manage private data using a secure approach that satisfies various goals of cryptography, such as confidentiality, integrity, authentication, or nonrepudiation. The local controller 104 can be programmed to communicate with other devices through a limited API allowing the storage or retrieval of private data. In accordance with that API, the local controller 104 can be programmed to receive a request from the main controller for storing private data, such as security keys or specific threat intelligence data that refers to personal information, in an encrypted form. The local controller 104 can be programmed to also receive a request from the main controller for retrieving private data from a data management system using additional private data, such as credentials for an account with the data management system in an encrypted form. In response to the request, the local controller 104 can be programmed to then retrieve the private data from the data management system. Furthermore, the local controller 104 can be programmed to receive a request from a security gateway system serving the same virtual cluster for retrieving the private data. The local controller 104 can be configured to ensure privacy and data integrity in communicating with the various systems by implementing the transport layer security (TLS) protocols or other techniques.

In some embodiments, the local controller 104 is programmed to manage the private data received from the main controller or a data management system using a secure data management technique known to someone skilled in the art, such as a key management service that implements advanced encryption, validation, and authentication methods or a secure database system that implements access control with authorization from a client device. The private data received from the main controller 102 can be stored locally or within the virtual cluster served by the local controller 104.

4.3 Security Gateway System

4.3.1 Communicating Health and Operational Data

In some embodiments, the security gateway system 124 is programmed to send heartbeats to the main controller periodically. Each heartbeat signals that the security gateway system 124 is alive and can reveal additional information, such as how busy the security gateway system 124 is. The security gateway system 124 can be programmed to also send operational data to the main controller regarding the security gateway system 124 or one of the computing applications served by the security gateway system 124. The operational data may indicate error codes or failure indicators or information regarding anomaly detection.

In some embodiments, the security gateway system 124 is programmed to detect that none of the computing applications served by the security gateway system 124 is responsive or operational and send a notification to the main controller. In response to the detection, the security gateway system 124 can be programmed to shut down automatically. Following the notification or at any time, the security gateway system 124 can be programmed to receive instructions from the main controller to shut down and act accordingly.

4.3.2 Managing Threat Intelligence Data

In some embodiments, the security gateway system 124 is programmed to receive threat intelligence data from the main controller and store the threat intelligence data in a database. As the threat intelligence data generally has been or can be matched with the computing applications served by the security gateway system 124, the threat intelligence data can be indexed or otherwise stored in a way to enable efficient determination of whether a type of threat intelligence data applies to a particular digital communication directed to one of the computing applications served by the security gateway system 124. The secure gateway system 124 is also programmed to retrieve specific threat intelligence data, which may refer to personal information, from the local controller serving the same virtual cluster on a need basis, as further discussed below.

In some embodiments, the security gateway system 124 is programmed to communicate with various computing devices as a network security gateway or firewall for the computing applications hosted by the virtual cluster served by the security gateway system 124. The digital communications may begin with a request in the form of a network packet for executing one of the computing applications from a consumer device residing outside the virtual cluster or one of the application devices residing within the virtual cluster. In processing each of the digital communications to eliminate security anomalies, the security gateway system 124 can be configured to initially operate under certain transport-level security protocols. Specifically, the security gateway system 124 can be configured to retrieve the secure keys associated with the target computing application from the local controller to satisfy these protocols without locally storing the secure keys.

In some embodiments, before performing deep inspection of the digital communication, the security gateway system 124 can be programmed to apply the threat intelligence data stored in the database or retrieved from the local controller. As the threat intelligence data may include characteristics of the source of a threat, the security gateway system 124 can be programmed to compare the source of the request with the threat intelligence data and take necessary remedial actions. For example, certain threat intelligence data may indicate that a particular IP address has a bad reputation for distributing spam or malware. Therefore, when the source of the digital communication is associated with that IP address, the security gateway system 124 can be configured to reject the entire request without specifically processing the request.

In some embodiments, the security gateway system 124 is configured to further perform application-level data decryption for the network packet. Furthermore, the security gateway system 124 is programmed to monitor or analyze metadata in the network packet, one or more payloads in the network packet, and metadata in user session states for security attacks. Specifically, the security gateway system 124 is programmed to further apply the threat intelligence data stored in the database or retrieved from the local controller. The security gateway system 124 can be programmed to compare the monitored or analyzed data with the threat intelligence data and take necessary remedial actions. For example, certain threat intelligence data may indicate that a file having a name that satisfies a specific pattern might contain a virus. Therefore, when the payload includes such a file, the security gateway system 124 can be configured to discard the file, terminate processing of the digital communication, or terminate the entire user session. When the processing is complete, the security gateway system 124 is programmed to transmit the application-level data that is deemed secure to the destination, such as the target computing application. The performance of these network security gateway functions is discussed in further detail in the co-pending U.S. patent application Ser. No. 16/019,539 filed on Jun. 27, 2018.

In some embodiments, the security gateway system 124 is programmed to store all the digital communications received by the security gateway system 124 together with certain metadata in a database. The metadata can include the source and destination of the digital communication, when the digital communication was received, when processing of the digital communication began or ended, or how the digital communication was processed.

In some embodiments, the security gateway system 124 is programmed to apply particular threat intelligence data indicating a particular threat to past digital communications stored in the database. The application can occur in response to receiving new threat intelligence data. The application can also occur in response to receiving a request from the client device for estimating the past or future impact of applying the particular threat intelligence data. As one example, the client device might have become aware of a specific pattern indicative of a new threat. Matching the specific pattern with the past digital communications may help determine how often a false positive might occur and thus how much undesirable impact there might be in blocking any digital communication matching the pattern. As another example, the client device might have learned that a specific IP address has been hacked. Matching the IP address with the past digital communications may help determine how much the computing applications served by the security gateway system 124 might rely on services provided by the IP address and thus how much undesirable impact there might be in blocking any digital communications associated with the IP address. Therefore, the security gateway system 124 can be programmed to send the match results to the client device for further determination of how the particular threat intelligence data should be applied in the future or for further update of the security policy. When certain past digital communications turn out to be positive matches to the particular intelligence data, the security gateway system 124 can be further configured to help determine when the particular threat actually started harming the computing applications or the extent of the consequence. For example, when the particular intelligence data indicates that a file having a name that matches a pattern would delete a profile when the file is opened, the security gateway system 124 can send data related to the threat, such as the deletion of the profile, and data related to the certain past digital communications, such as the dates when each such digital communication was sent to a computing application, to the client device for further determination of whether the profile went missing around one of those dates.

5. EXAMPLE PROCESSES

Figure 4:
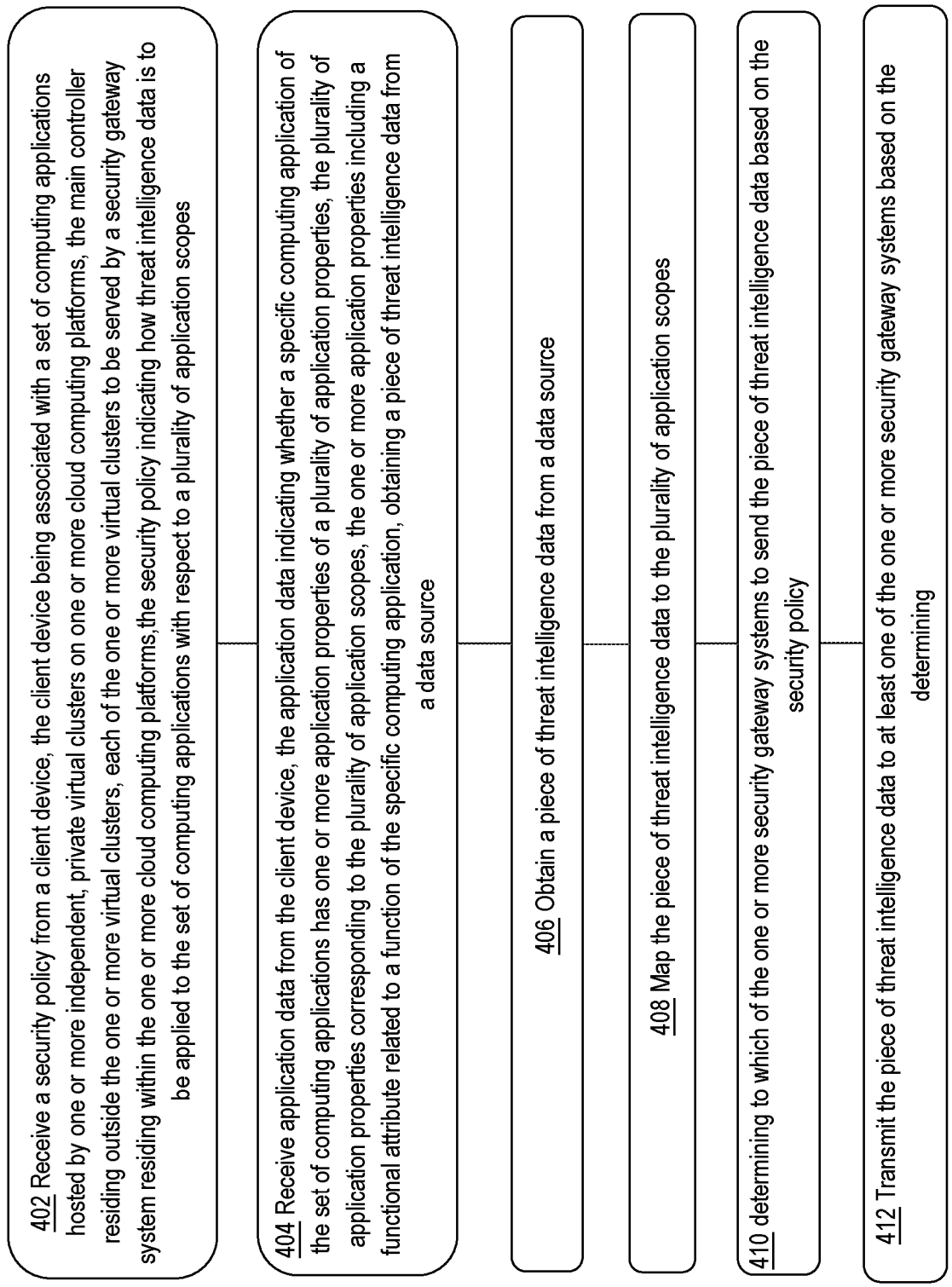
FIG. 4 illustrates an example process performed by a main controller of managing security services for one or more cloud computing platforms.
Figure 5:
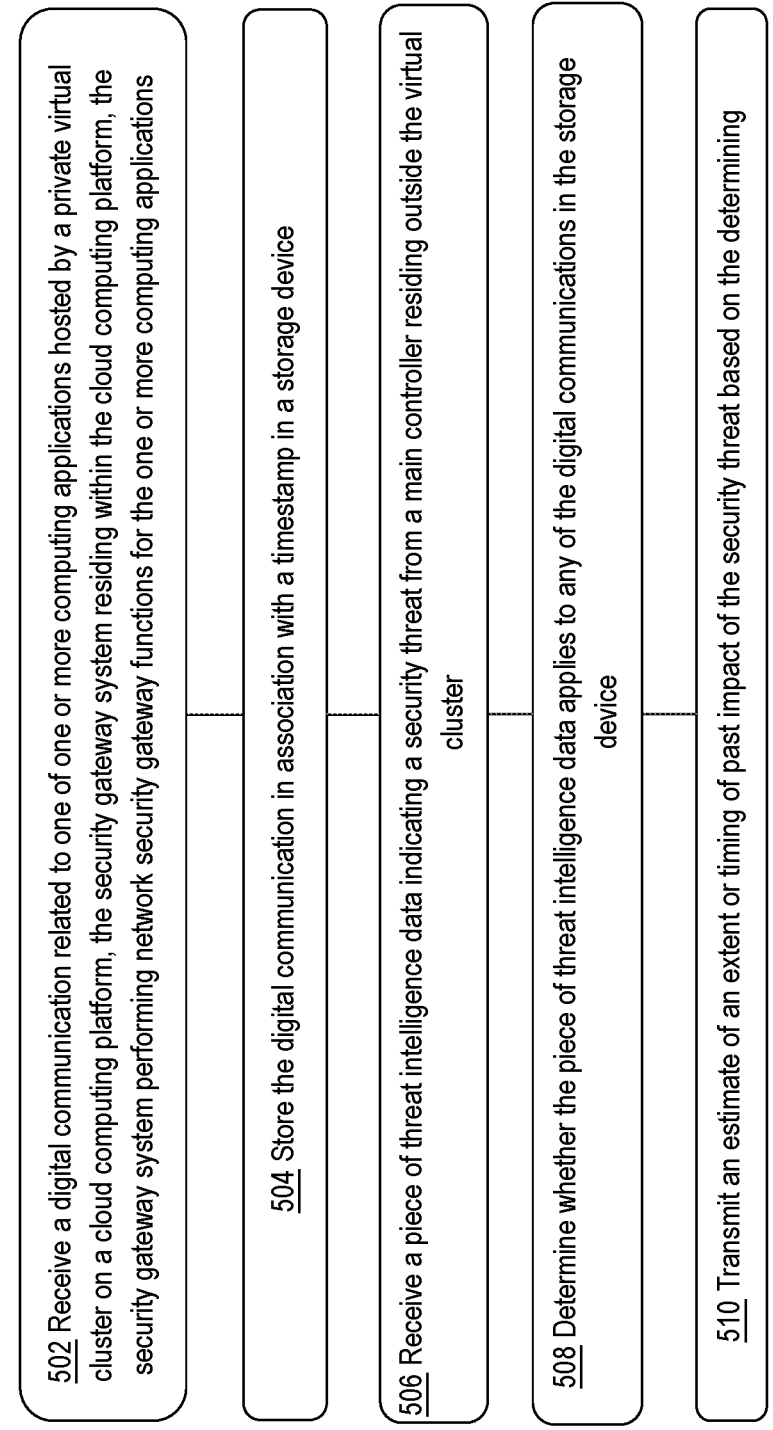
FIG. 5 illustrates an example process performed by a security gateway system of managing security services for one or more cloud computing platforms.

FIG. 4 illustrates an example process performed by a main controller of managing security services for one or more cloud computing platforms. FIG. 5 illustrates an example process performed by a security gateway system of managing security services for one or more cloud computing platforms. Each of these figures illustrates an example process performed by the claim processing server computer of verifying a claim using digital image data. Each of these figures is shown in simplified, schematic format for purposes of illustrating a clear example and other embodiments may include more, fewer, or different elements connected in various manners. Each of these figures is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

Referring back to FIG. 4, in some embodiments, initially, the main controller 102 is programmed to receive a request from a client device for establishing an account. In step 402, the main controller 102 is programmed or configured to receive a security policy from the client device associated with the account. The client device is associated with a set of computing applications hosted by one or more independent, private virtual clusters on one or more cloud computing platforms, while the main controller 102 resides outside the one or more virtual clusters. In response to the request for establishing the account, the main controller 102 is programmed to cause launching a local controller and a security gateway system for each of the one or more virtual clusters. A local controller typically would reside within the corresponding virtual cluster, while a security gateway system typically would reside within the corresponding cloud computing platform. The security policy indicates how threat intelligence data is to be applied to the set of computing applications with respect to a plurality of application scopes.

In some embodiments, in step 404, the main controller 102 is programmed or configured to receive application data from the client device associated with the account. The application data indicates whether a specific computing application of the set of computing applications has one or more application properties of a plurality of application properties. The plurality of application properties generally corresponds to the plurality of application scopes. The plurality of application properties may include a name, a size, a membership of a virtual cluster, an applicable industry, or a functional attribute related to a function of the specific computing application.

In some embodiments, in step 406, the main controller 102 is programmed or configured to obtain a piece of threat intelligence data from a data source. The data source can be an online threat intelligence feed or one of the one or more security gateway systems based on deep inspection of the digital communications received by the one or more security gateway systems. In step 408, the main controller 102 is programmed or configured to map the piece of threat intelligence data to the plurality of application scopes. The piece of threat intelligence data typically indicates a source of a computer security threat, a nature of the computer security threat, or the target of a computer security threat can thus be readily mapped to the plurality of application scopes.

In some embodiment, in step 410, the main controller 102 is programmed or configured to determine to which of the one or more security gateway systems to send the piece of threat intelligence data based on the security policy. As security policy indicates how the threat intelligence data is to be delivered to a certain security gateway system of the one or more security gateway systems serving a corresponding virtual cluster and ultimately applied to at least one computing application hosted by the virtual cluster, the main controller 102 can be programmed to determine whether to send the piece of threat intelligence data the certain security gateway system.

In step 412, the main controller 102 is programmed or configured to then transmit the piece of threat intelligence data to at least one of the one or more security gateway systems based on the determining. The transmission may occur immediately after the determining, upon a request by the client device, or when enough threat intelligence has been received since the last transmission. The piece of threat intelligence data can be transmitted in association with certain metadata, such as the source of the piece of threat intelligence data or the time of receipt.

Referring back to FIG. 5, in some embodiments, in step 502, the security gateway system 124 is programmed or configured to receive a digital communication related to one of one or more computing applications hosted by a private virtual cluster on a cloud computing platform. While residing within the cloud computing platform, the security gateway 124 is configured to perform network security gateway functions for the one or more computing applications. Generally, the digital communication is a request for executing one of the one or more computing application or a reply produced by the one computing application in response to the request.

In some embodiments, in step 504, the security gateway system 124 is programmed or configured to store the digital communication in association with a timestamp in a storage device. The digital communication can be stored in association with additional metadata, such as information indicating the source or target of the digital communication.

In some embodiments, in step 506, the security gateway system 124 is programmed or configured to receive a piece of threat intelligence data indicating a security threat from a main controller residing outside the virtual cluster. The piece of threat intelligence data can be accompanied with an instruction to estimate a past or future impact of the security threat on the virtual cluster before storing and applying the piece of threat intelligence data to future digital communications. Alternatively, a separate request can be received directly from a client device directly for estimating a past or future impact of the security threat.

In some embodiments, in step 508, the security gateway system 124 is programmed or configured to determine whether the piece of threat intelligence data applies to any of the digital communications in the storage device. Typically, the piece of threat intelligence data would indicate a source of the computer security threat, a nature of the computer security threat, or a target of the computer security threat, and thus could be readily matched to a digital communication and associated metadata in the storage device. A match would then contribute to the estimated past or future impact of the security threat. Specifically, the match might indicate when a security anomaly might have occurred in the past.

In some embodiments, in step 510, the security gateway system 124 is programmed or configured to transmit an estimate of an extent or timing of past impact of the security threat based on the determining. The estimate could be sent to the client device directly or though the main controller.

6. IMPLEMENTATION EXAMPLE—HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 604. Memory 606 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 612. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 602. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 620 typically provides electrical, electromagnetic, or optical data communication directly or through at least one network to other data devices, using, for example, satellite, cellular, Wi-Fi, or BLUETOOTH technology. For example, network link 620 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618.

In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7.0 EXTENSIONS AND ALTERNATIVES

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of managing security services for one or more cloud computing platforms, comprising:
   receiving, by a main controller, a security policy from a client device,
      the client device being associated with a set of computing applications hosted by one or more virtual clusters that are independent and private on one or more cloud computing platforms,
      the main controller residing outside the one or more virtual clusters,
      each of the one or more virtual clusters to be served by a security gateway system residing within the one or more cloud computing platforms,
   the security policy indicating how threat intelligence data is to be applied to the set of computing applications with respect to a plurality of application scopes;

receiving application data from the client device,
  the application data indicating whether a specific computing application of the set of computing applications has one or more application properties of a plurality of application properties,
  the application data indicating, for the one application property of the specific computing application, a key and a corresponding value of the key, the key being defined by the client device or the cloud computing platform having the virtual cluster hosting the specific computing application,
  the plurality of application properties corresponding to the plurality of application scopes,
  the one or more application properties including a functional attribute related to a function of the specific computing application,
obtaining a piece of threat intelligence data from a data source;
mapping the piece of threat intelligence data to the plurality of application scopes;
determining to which of the one or more security gateway systems to send the piece of threat intelligence data based on the security policy;
transmitting the piece of threat intelligence data to at least one of the one or more security gateway systems based on the determining.

2. The computer-implemented method of claim 1,
the obtaining comprising crawling a Web interface of an online threat intelligence feed or receiving security anomaly data from one of the one or more security gateway systems or another security gateway system,
the piece of threat intelligence data including information regarding a source of a computer security threat, a nature of the computer security threat, or a target of the computer security threat.

3. The computer-implemented method of claim 1, the plurality of application scopes including:
  a client device scope covering the set of computing applications,
  a geographical region scope covering the set of computing applications hosted by at least one of the one or more cloud computing platforms located in one geographical region,
  a cloud computing platform scope covering the set of computing applications hosted by one of the one or more cloud computing platforms,
  a virtual cluster scope covering the set of computing applications hosted by one of the one or more virtual clusters on the one or more cloud computing platforms,
  an individual application scope covering one of the set of computing applications, or
  one or more application functional attribute scopes, each covering the set of computing applications having a corresponding application functional attribute.

4. The computer-implemented method of claim 1, further comprising:
  obtaining an API of the specific computing application;
  identifying an additional function attribute related to the API;
  updating the application data and the security policy based on the identifying.

5. The computer-implemented method of claim 1, further comprising:
  receiving a request from the client device for estimating an impact of a security threat on the one or more virtual clusters;
  sending an instruction to a set of the one or more security gateway systems to estimate the impact of the security threat based on historical digital communications received and stored by the at least one of the one or more security gateway systems;
  receiving an estimate of the impact the of the security threat from the set of security gateway systems;
  updating the security policy based on the estimate.

6. The computer-implemented method of claim 1, further comprising:
  receiving a request from the client device for establishing an account to be associated with the security policy and application data;
  in response to the request, causing launching the one or more security gateway systems respectively on the one or more cloud computing platforms;
  receiving heartbeats from the one or more security gateway systems;
  adjusting a number or structure of security gateway systems serving the one virtual cluster based on the heartbeats.

7. The computer-implemented method of claim 1, further comprising:
  after receiving the security policy, causing launching one or more local controllers respectively on the one or more virtual clusters;
  receiving private data from the client device, including security keys in an encrypted form associated with the set of computing applications;
  distributing the private data to the one or more local controllers.

8. The computer-implemented method of claim 1, further comprising receiving cloud data from the client device regarding the one or more virtual clusters or the one or more cloud computing platforms, including a geographic location or subnet information.

9. The computer-implemented method of claim 1,
  the piece of threat intelligence data including reputation information related to an Internet Protocol (IP) address,
  the security policy including a rule that all threat intelligence data including reputation information is to be transmitted to the at least one security gateway system of the one or more security gateway systems.

10. The computer-implemented method of claim 1, the security policy including one or more rules with respect to a type of a threat, a list of attributes of the threat, or an estimated impact of the threat.

11. The computer-implemented method of claim 1,
  the piece of threat intelligence data indicating a blacklisted email domain targeting email accounts in a specific geographic region,
  the mapping comprising selecting an application scope corresponding to cloud computing platforms located in the specific geographic region or an application scope corresponding to an application functional attribute of email communication.

12. One or more non-transitory computer-readable storage media storing sequences of instructions which when executed cause one or more hardware processors to perform a computer-implemented method of managing security services for one or more cloud computing platforms, the method comprising:
  receiving, by a main controller, a security policy from a client device,
    the client device being associated with a set of computing applications hosted by one or more virtual clusters that are independent and private on one or more cloud computing platforms, the main controller residing outside the one or more virtual clusters, each of the one or more virtual clusters to be served by a security gateway system residing within the one or more cloud computing platforms, the security policy indicating how threat intelligence data is to be applied to the set of computing applications with respect to a plurality of application scopes;

receiving application data from the client device, the application data indicating whether a specific computing application of the set of computing applications has one or more application properties of a plurality of application properties, the application data indicating, for the one application property of the specific computing application, a key and a corresponding value of the key, the key being defined by the client device or the cloud computing platform having the virtual cluster hosting the specific computing application, the plurality of application properties corresponding to the plurality of application scopes, the one or more application properties including a functional attribute related to a function of the specific computing application, obtaining a piece of threat intelligence data from a data source;

mapping the piece of threat intelligence data to the plurality of application scopes;

determining to which of the one or more security gateway systems to send the piece of threat intelligence data based on the security policy;

transmitting the piece of threat intelligence data to at least one of the one or more security gateway systems based on the determining.

13. The one or more non-transitory computer-readable storage media of claim 12, the obtaining comprising crawling a Web interface of an online threat intelligence feed or receiving security anomaly data from one of the one or more security gateway systems or another security gateway system, the piece of threat intelligence data including information regarding a source of a computer security threat, a nature of the computer security threat, or a target of the computer security threat.

14. The one or more non-transitory computer-readable storage media of claim 12, the plurality of application scopes including:

a client device scope covering the set of computing applications, a geographical region scope covering the set of computing applications hosted by at least one of the one or more cloud computing platforms located in one geographical region, a cloud computing platform scope covering the set of computing applications hosted by one of the one or more cloud computing platforms, a virtual cluster scope covering the set of computing applications hosted by one of the one or more virtual clusters on the one or more cloud computing platforms, an individual application scope covering one of the set of computing applications, or one or more application functional attribute scopes, each covering the set of computing applications having a corresponding application functional attribute.

15. The one or more non-transitory computer-readable storage media of claim 12, the method further comprising:

obtaining an API of the specific computing application;

identifying an additional function attribute related to the API;

updating the application data and the security policy based on the identifying.

16. The one or more non-transitory computer-readable storage media of claim 12, the method further comprising:

receiving a request from the client device for estimating an impact of a security threat on the one or more virtual clusters;

sending an instruction to a set of the one or more security gateway systems to estimate the impact of the security threat based on historical digital communications received and stored by the at least one of the one or more security gateway systems;

receiving an estimate of the impact the of the security threat from the set of security gateway systems;

updating the security policy based on the estimate.

17. The one or more non-transitory computer-readable storage media of claim 12, the method further comprising:

receiving a request from the client device for establishing an account to be associated with the security policy and application data;

in response to the request, causing launching the one or more security gateway systems respectively on the one or more cloud computing platforms;

receiving heartbeats from the one or more security gateway systems;

adjusting a number or structure of security gateway systems serving the one virtual cluster based on the heartbeats.

18. The one or more non-transitory computer-readable storage media of claim 12, the method further comprising:

after receiving the security policy, causing launching one or more local controllers respectively on the one or more virtual clusters;

receiving private data from the client device, including security keys in an encrypted form associated with the set of computing applications;

distributing the private data to the one or more local controllers.

19. The one or more non-transitory computer-readable storage media of claim 12, the piece of threat intelligence data including reputation information related to an Internet Protocol (IP) address, the security policy including a rule that all threat intelligence data including reputation information is to be transmitted to the at least one security gateway system of the one or more security gateway systems.

20. The one or more non-transitory computer-readable storage media of claim 12, the piece of threat intelligence data indicating a blacklisted email domain targeting email accounts in a specific geographic region, the mapping comprising selecting an application scope corresponding to cloud computing platforms located in the specific geographic region or an application scope corresponding to an application functional attribute of email communication.

* * * * *